(12) United States Patent
Bhattacharjee et al.

(10) Patent No.: US 8,883,371 B2
(45) Date of Patent: Nov. 11, 2014

(54) HYDROGEN STORAGE MATERIALS AND HYDROGEN FUEL CELLS

(75) Inventors: Joydeep Bhattacharjee, Chandannagore (IN); Kota V. R. M. Murali, Bangalore (IN)

(73) Assignee: Motorola Mobility LLC, Libertyville, IL (US)

(*) Notice: Subject to any disclaimer, the term of this patent is extended or adjusted under 35 U.S.C. 154(b) by 2033 days.

(21) Appl. No.: 11/873,176

(22) Filed: Oct. 16, 2007

(65) Prior Publication Data

US 2009/0098423 A1 Apr. 16, 2009

(51) Int. Cl.
*C01B 3/00* (2006.01)
*H01M 8/06* (2006.01)
*H01M 8/00* (2006.01)

(52) U.S. Cl.
CPC .............. *C01B 3/0026* (2013.01); *H01M 8/00* (2013.01); *C01B 3/001* (2013.01); *C01B 3/0031* (2013.01); *Y02E 60/327* (2013.01)
USPC ............ 429/523; 423/284; 423/297; 423/351

(58) Field of Classification Search
CPC ......... H01M 4/242; H01M 8/00; H01M 8/18; C01B 3/001; C01B 3/0005; C01B 3/0026; C01B 3/0031
USPC ........... 429/523; 423/276, 284, 297, 351, 413
See application file for complete search history.

(56) References Cited

U.S. PATENT DOCUMENTS

| | | | |
|---|---|---|---|
| 4,079,523 A | 3/1978 | Sandrock | |
| 4,457,891 A | 7/1984 | Berauer et al. | |
| 5,432,023 A | 7/1995 | Yamada et al. | |
| 6,099,984 A | 8/2000 | Rock | |
| 6,127,058 A | 10/2000 | Pratt et al. | |
| 6,830,725 B2 | 12/2004 | Fetcenko et al. | |
| 7,094,387 B2 | 8/2006 | Zidan | |
| 7,108,757 B2 | 9/2006 | Huang et al. | |
| 2005/0191236 A1* | 9/2005 | Pinkerton et al. | 423/658.2 |
| 2006/0090394 A1* | 5/2006 | Torgersen et al. | 423/644 |
| 2008/0311017 A1* | 12/2008 | Burrell et al. | 423/263 |

FOREIGN PATENT DOCUMENTS

| | | | | |
|---|---|---|---|---|
| WO | WO 9527315 A1 * | 10/1995 | | C01B 3/00 |
| WO | WO 2006063627 A1 * | 6/2006 | | C01B 3/02 |
| WO | WO 2007/015597 A1 | 2/2007 | | |
| WO | WO 2007015597 A1 * | 2/2007 | | C01B 3/00 |

OTHER PUBLICATIONS

"Renierite Mineral Data." Mineralogy Database. Web. Nov. 17, 2011. <http://webmineral.com/data/Renierite.shtml>.*

(Continued)

*Primary Examiner* — Edu E Enin-Okut
(74) *Attorney, Agent, or Firm* — Leydig, Voit & Mayer, Ltd

(57) ABSTRACT

Hydrogen storage materials are provided that may be capable of a hydrogenated state and dehydrogenated state. The hydrogen storage material comprises a plurality of hydrogen storage molecular units. Each hydrogen storage molecular unit comprises a transition metal bonded to one or more elements from period 2 of the periodic table, wherein the hydrogen storage material includes at least 6.5% molecular hydrogen by weight when in the hydrogenated state and is stable at temperatures below about 200° C. and at pressures of about 1 atm and below. The hydrogen storage materials may be used in conjunction with fuel cells in portable electronic devices.

17 Claims, 9 Drawing Sheets

(56) References Cited

OTHER PUBLICATIONS

Yildirim, T., et a., Titanium-Decorated Carbon Nanotubes as a Potential High-Capacity Hydrogen Storage Medium, Phys. Rev. Lett. 94, 175501 (2005).

Rowsell, J. et al., Gas Adsorption Sites in a Large-Pore Metal-Organic Framework, Science, 2005, 309, 1350.

Jin., H., et al., Decreasing the hydrogen desorption temperature of LiNH2 through doping: A first-principles study, Appl. Phys. Lett. 87, 181917 (2005).

Song,Y., et al., Electronic structure, stability and bonding of the Li—N—H hydrogen storage system, Phys. Rev. B 74, 195120 (2006).

Peterson, V., et al., Neutron Powder Diffraction Study of D2 Sorption in Cu3 (1,3,5-benzenetricarboxylate)2, J.Am. Chem. Soc., 128, 2006, 15578-15579.

Dinca, M., et al., Hydrogen Storage in a Microporous Metal-Organic Framework with Exposed Mn2+ Coordination Sites, J.Am.Chem. Soc., 128, 2006, 16876-16883.

Lin, X., et al., High H2 Adsorption by Coordination-Framework Materials, Angew Chem. Int. Ed., 2006, 45,7358-7364.

Kitaura, et al., "Immobilization of a Metallo Schiff Base into a Microporous Coordination Polymer," Angewandte Chemie International Edition, vol. 43, 2004, pp. 2684-2687.

Wong-Foy, et al.,. "Exceptional H2 Saturation Uptake in Microporous Metal-Organic Frameworks," Journal of the American Chemical Society, vol. 128, No. 11, 2006, pp. 3494-3495.

Zhao, et al., "Self-Catalyzed Hydrogenation and Dihydrogen Adsorption on Titanium Carbide Nanoparticles," Chemical Physics Letters, North-Holland, Amsterdam, vol. 425, No. 4-6, Jul. 10, 2006, pp. 273-177.

Kitagawa, et al., "Pore Surface Engineering of Microporous Coordination Polymers," Chmical Communications, 2006, pp. 701-707.

Anke Galleiske, "PCT International Search Report and Written Opinion," WIPO, ISA/EP, European Patent Office, Rijswijk, Netherlands, Apr. 7, 2009.

\* cited by examiner

HYDROGEN STORAGE MATERIALS AND HYDROGEN FUEL CELLS

TECHNICAL FIELD

The inventive subject matter generally relates to hydrogen storage, and more particularly relates to hydrogen storage materials which can be used in conjunction with fuel cells.

BACKGROUND

Hydrogen is a relatively environmentally-friendly, abundant fuel source that, when reacted with oxygen, produces energy and water Hydrogen has been traditionally used as fuel for rockets, but has also been used as fuel for automobiles. In such cases, noncombustive technologies such as fuel cells have been used to extract energy from hydrogen. In particular, the fuel cells have been designed to host a reverse electrolysis process to generate electricity and water. Recently, fuel cells have been employed as replacements for batteries in portable, hand-held devices.

Although hydrogen fuel sources have many technical advantages over other fuel sources, storing hydrogen has presented a challenge. For example, in some cases, hydrogen is stored as a compressed gas in a storage tank, but such tanks may only be capable of holding up to about 10% of hydrogen by weight. In other cases, hydrogen is extracted from liquid hydrocarbons with CO (carbon monoxide) as an undesirable byproduct. Moreover, hydrogen gas is a relatively flammable material, and safety may become an issue if a storage container in which the hydrogen is stored becomes damaged.

Recently, other storage options, such as solid state hydrogen storage, have been investigated. For example, metal hydrides have been discovered as viable solid state hydrogen storage materials. However, metal hydrides typically absorb atomic hydrogen by forming covalent sigma bonds, and as a result, the hydrogen may be relatively difficult to remove. For example, high temperatures (e.g., >600° C.) may be used to release the hydrogen. Other hydrides, such as aluminum hydrides with alkali metals such as sodium, potassium, and lithium, may desorb hydrogen at practical temperatures and pressures for mobile consumer applications (e.g., at temperatures below about 200° C. and at pressures about 1 atm), but have low weight percentage of hydrogen adsorption. Still other hydrides may produce effective hydrogen storage materials capable of storing about 7% hydrogen by weight at practical temperatures and pressures; however, when these materials are subjected to a temperature in a range of between about 50-150° C., they may only release about 5% hydrogen by weight. Alternatively, a relatively large amount of pressure may be needed to cause a release from the material of more than 5% hydrogen by weight.

Accordingly, it is desirable to have a hydrogen storage material that can remain stable at room temperature (e.g., between about 20-25° C.) and at pressures of about 1 atm. It is also desirable for the hydrogen storage material to adsorb and desorb hydrogen at temperatures that are below about 200° C. and at pressures less than about 1 atm. Moreover, it is desirable for the hydrogen storage to be capable of releasing more than 6.5% hydrogen by weight at such temperatures and pressures. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

In an embodiment, by way of example only, hydrogen storage materials are provided that may be capable of a hydrogenated state and dehydrogenated state. The hydrogen storage material comprises a solid state material comprising a plurality of hydrogen storage molecular units. Each hydrogen storage molecular unit comprises of two transition metal atoms bonded to two elements from period 2 of the periodic table, wherein the hydrogen storage material includes at least 6.5% molecular hydrogen by weight when in the hydrogenated state and is stable at temperatures below about 200° C.

In another embodiment, by way of example only, a hydrogen fuel cell is provided. The hydrogen fuel cell a substrate and a hydrogen storage material disposed on the substrate, the hydrogen storage material comprising a plurality of hydrogen storage molecular units, each hydrogen storage molecular unit comprising a transition metal bonded to one or more elements from period 2 of the periodic table, wherein the hydrogen storage material includes at least 6.5% molecular hydrogen by weight when in a hydrogenated state and is stable at temperatures below about 200° C. and at pressures of about 1 atm and below.

BRIEF DESCRIPTION OF THE DRAWINGS

The inventive subject matter will hereinafter be described in conjunction with the following drawing figures, wherein like numerals denote like elements, also hydrogen is shown in magenta, boron in grey, nitrogen in blue, carbon in golden, oxygen in red and titanium in cyan.

DETAILED DESCRIPTION

The following detailed description of the inventive subject matter is merely exemplary in nature and is not intended to limit the inventive subject matter or the application and uses of the inventive subject matter. Furthermore, there is no intention to be bound by any theory presented in the preceding background of the inventive subject matter or the following detailed description of the inventive subject matter.

Novel materials have been discovered that may be capable of storing hydrogen in a solid state. The hydrogen storage materials may be in a two- or three-dimensional structural form that is capable of maintaining stability when exposed to temperatures that are below about 200° C. and to pressures of about 1 atm or less. In an exemplary embodiment, the hydrogen storage material may be capable of adsorbing hydrogen to form a hydrogenated material or desorbing hydrogen to form a dehydrogenated material. In another embodiment, the hydrogen storage material may include at least about 6.5% molecular hydrogen ($H_2$) by weight, in a hydrogenated state, at temperatures that are below about 200° C. and at pressures of about 1 atm or less. In another embodiment, the hydrogen storage material may include at least about 8.0% $H_2$ by weight, in a hydrogenated state under the aforementioned temperature and pressure conditions.

The hydrogen storage material may comprise a hydrogen storage molecular unit that includes one transition metal and one or more elements from the second period of the periodic table. The transition metal has one or more empty 3d orbitals that are susceptible to forming bonds with other elements. The affinity of the transition metal to hydrogen, can be tuned by attaching the transition metal to one or more elements from the second period of the periodic table. This allows hybridizations which lead to d-orbital-semi-dative bonding of the transition metal with electrons disposed in a σ orbital formed between two hydrogen atoms of a $H_2$ molecule. Selection of the particular one or more elements may depend on whether the hydrogen storage material is used to form a two-dimensional structure or a three-dimensional, whether the structure has a plurality of unit cells that are substantially identical in make up, and/or what particular elements make up the structures into which the hydrogen storage material may be incorporated. For example, the transition metal may be titanium (Ti) and the one or more elements may be nitrogen (N), nitrogen and boron (B), or nitrogen and carbon (C).

Figure 1:
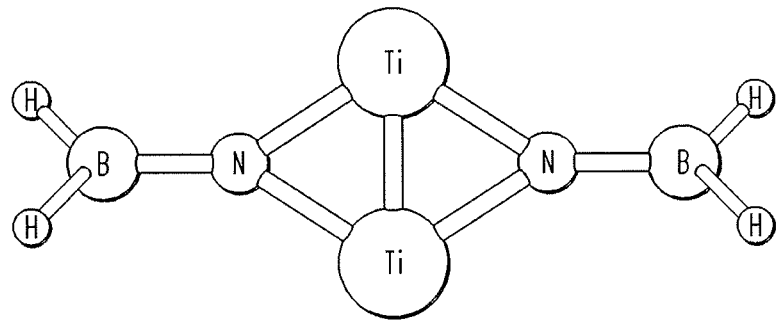
FIG. 1 is a hydrogen storage molecular unit in a dehydrogenated state, according to an embodiment.
Figure 2:
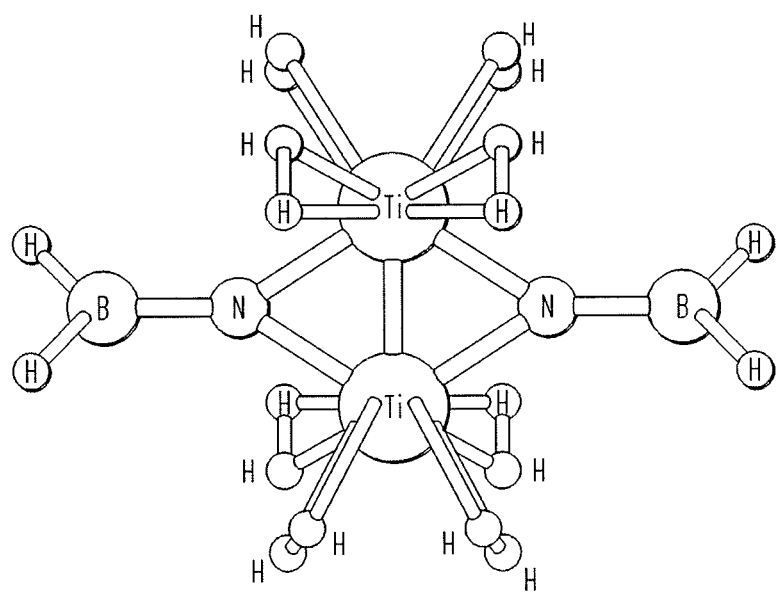
FIG. 2 is a hydrogen storage molecular unit in a hydrogenated state, according to an embodiment.

An embodiment of a hydrogen storage molecular unit in a dehydrogenated state and a hydrogenated state is shown in FIGS. 1 and 2. Referring to FIG. 1, the hydrogen storage molecular unit includes two titanium atoms bonded to each other and each bonded to the same two nitrogen atoms. Each nitrogen atom is also bonded to a boron atom. The total binding energy of the dehydrogenated hydrogen storage molecular unit may be about −55 eV, indicating that it can have a stable structure at temperatures that are below about 200° C. and at pressures of about 1 atm or less, and more particularly at temperatures of between about 20-25° C. Referring to FIG. 2, after hydrogen adsorption occurs, the bond between the two central titanium atoms break and each adsorbs four molecules of hydrogen to yield a total adsorption of eight molecules of hydrogen. As a result, the hydrogen storage molecular unit may include more than 10% by weight hydrogen.

Figure 3:
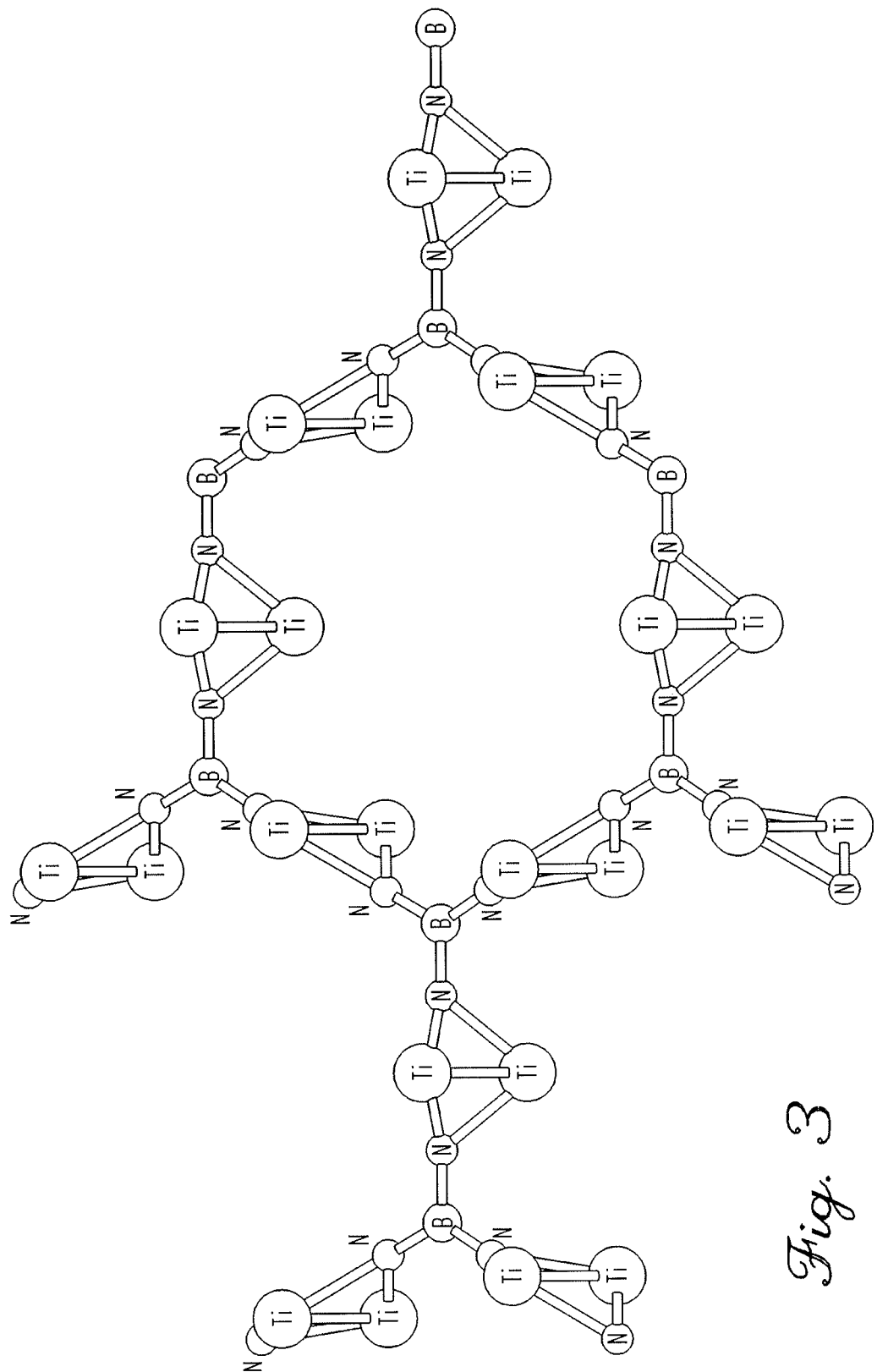
FIG. 3 is a slanted view of a two-dimensional hydrogen storage material, according to an embodiment.
Figure 4:
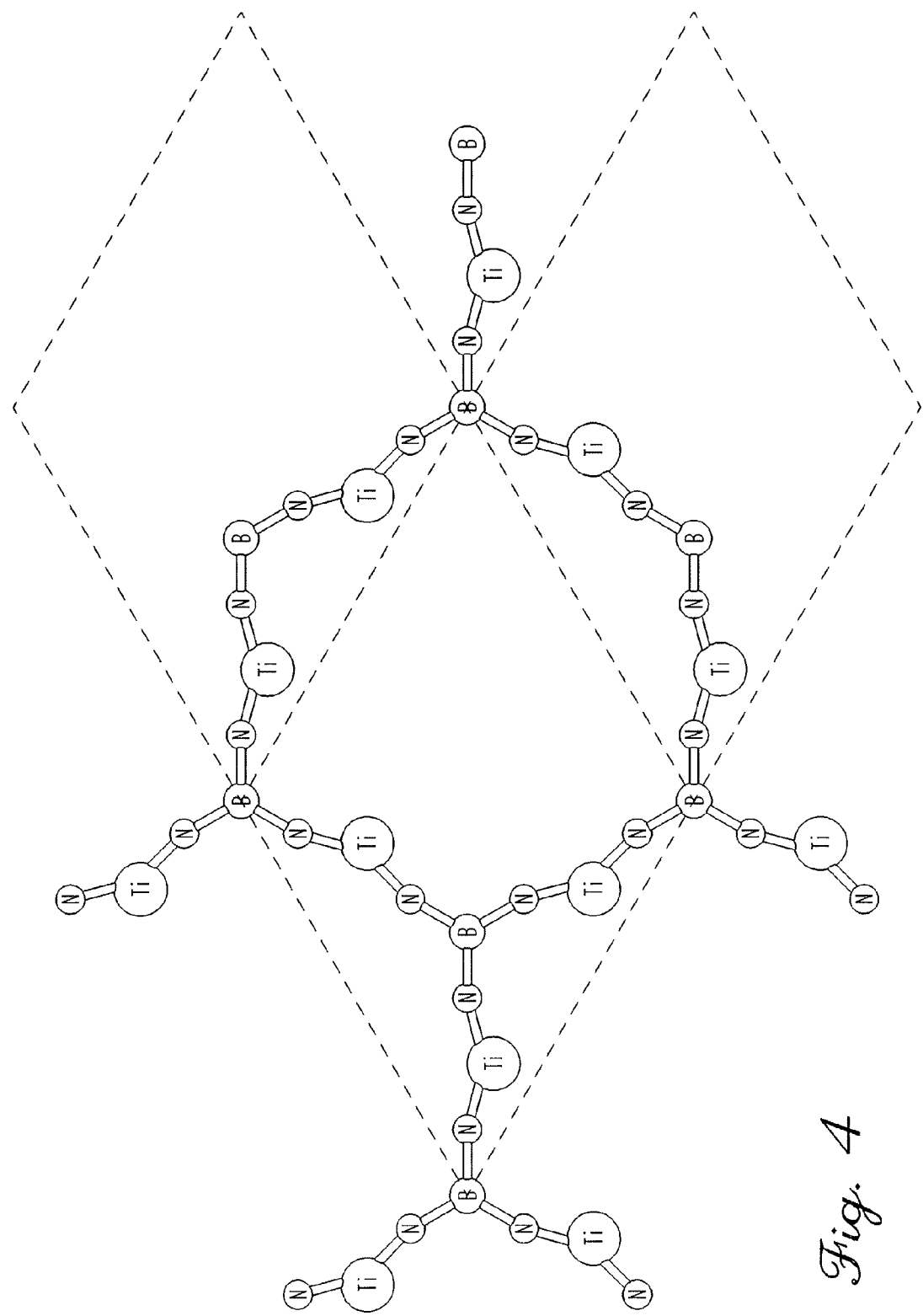
FIG. 4 is a top view of a two-dimensional hydrogen storage material, according to an embodiment.

In another embodiment, the hydrogen storage material may be used to form two-dimensional hydrogen storage materials. The two-dimensional hydrogen storage materials may include a plurality of unit cells that are substantially identical, according to an exemplary embodiment. Each unit cell may comprise a hydrogen storage molecular unit, where each is a molecule of titanium bonded to nitrogen, and boron. Slanted and top views of a unit cell of the two-dimensional hydrogen storage material in a dehydrogenated state are shown in FIGS. 3 and 4, according to an embodiment.

The unit cell includes a plurality of hydrogen storage molecular units where two titanium atoms are bonded to each other and to the same two nitrogen atoms. Each nitrogen atom is, in turn, bonded to a boron atom. This dehydrogenated unit cell has a total binding energy of about −100 eV, which indicates a stable structure at room temperature (e.g., about 20-25° C.) and at 1 atm. When the two-dimensional hydrogen storage material is fully hydrogenated, adsorption energy of each hydrogen molecule is about −0.3 eV. It will be appreciated that adsorption energy of each hydrogen molecule may preferably be in a range of between about −0.2 to −0.6 eV. Binding energies falling within the aforementioned range may indicate that the material can release hydrogen at or slightly above (e.g. +10° C.) room temperature and at 1 atm pressure.

Figure 5:
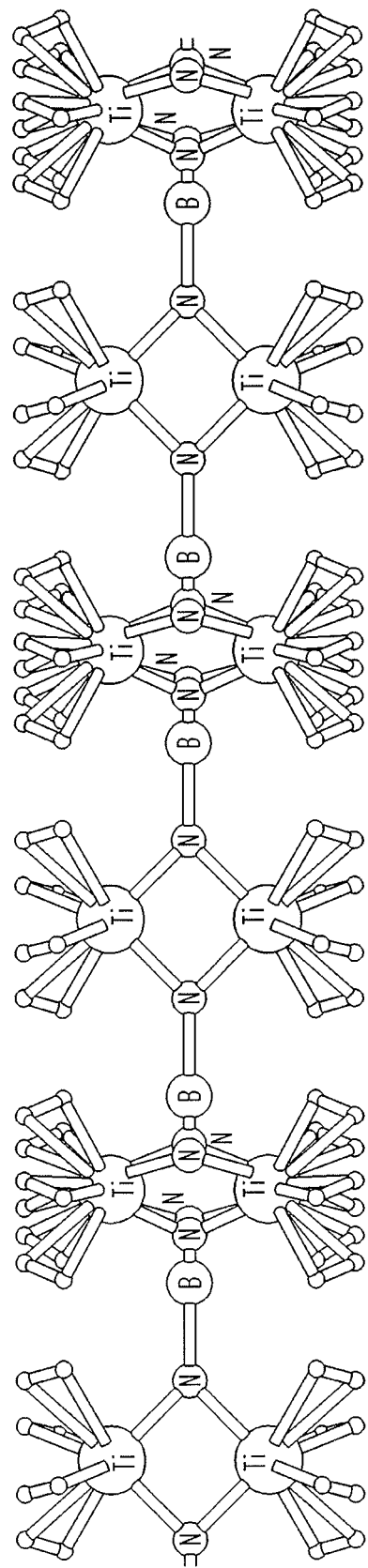
FIG. 5 is a side view of a two-dimensional hydrogen storage material in a hydrogenated state, according to an embodiment.
Figure 6:
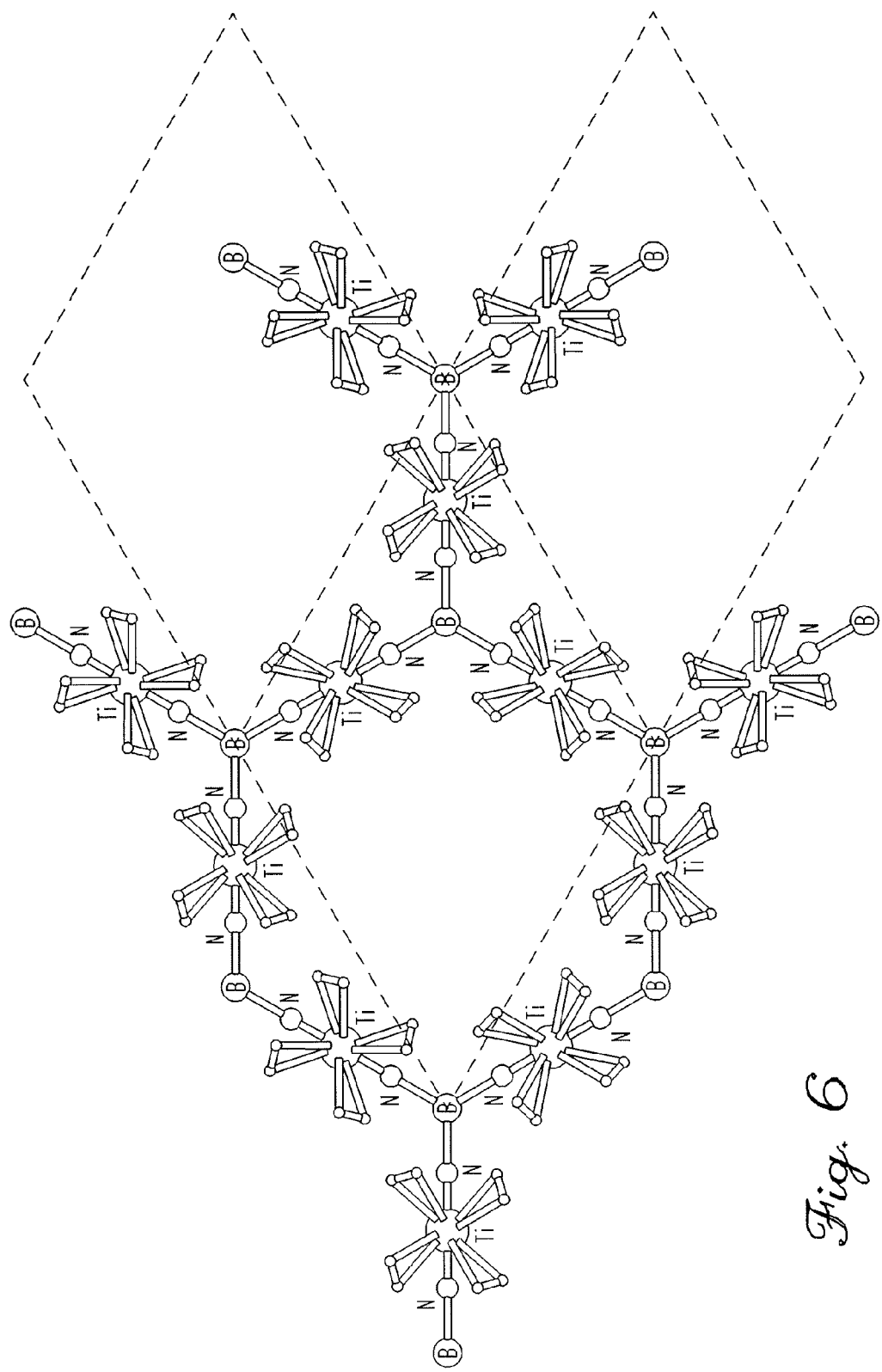
FIG. 6 is a top view of a two-dimensional hydrogen storage material in a hydrogenated state, according to an embodiment.

Side and top views of a two-dimensional hydrogen storage material in a hydrogenated state are shown in FIGS. 5 and 6. After hydrogenation, each titanium atom adsorbs four molecules of hydrogen to yield a total adsorption of eight molecules of hydrogen. As a result, the two-dimensional hydrogen storage material may include at least about 10.88% weight percentage of adsorbed hydrogen.

As mentioned briefly above, the hydrogen storage material alternatively may be a three-dimensional structure. In an exemplary embodiment, the hydrogen storage material may be a porous crystalline structure. The porous crystalline structure may comprise a plurality of unit cells that are arranged in a repeating polyhedral structure. Each unit cell may include a core unit linked to each other by one or more linker units. In one embodiment, each core unit forms a vertex of the polyhedral structure of the hydrogen storage material.

For example, the hydrogen storage material may have a cubic structure. In this regard, each unit cell may include six vertices that are linked together, such that the bond angles between the linked vertices may be about 90 degrees. In these cases, the core units may be molecules that are capable of forming a framework having such bond angles when linked together by the linker units. In an embodiment, the cubic framework core molecules may be molecules, such as $Zn_4O_{13}$, capable of forming metal organic frameworks. In still another embodiment, the cubic framework core molecules may be molecules, such as $CuO_6$, capable of forming Cu-based frameworks, molecules, such as Mn atoms, capable of forming Mn-based frameworks, molecules, such as $FeO_6$, forming Fe-based frameworks, molecules, such as $Ag_6N_6$, forming Ag-based frameworks, or molecules such as $B_6H_6$, forming B-based frameworks.

Figure 7:
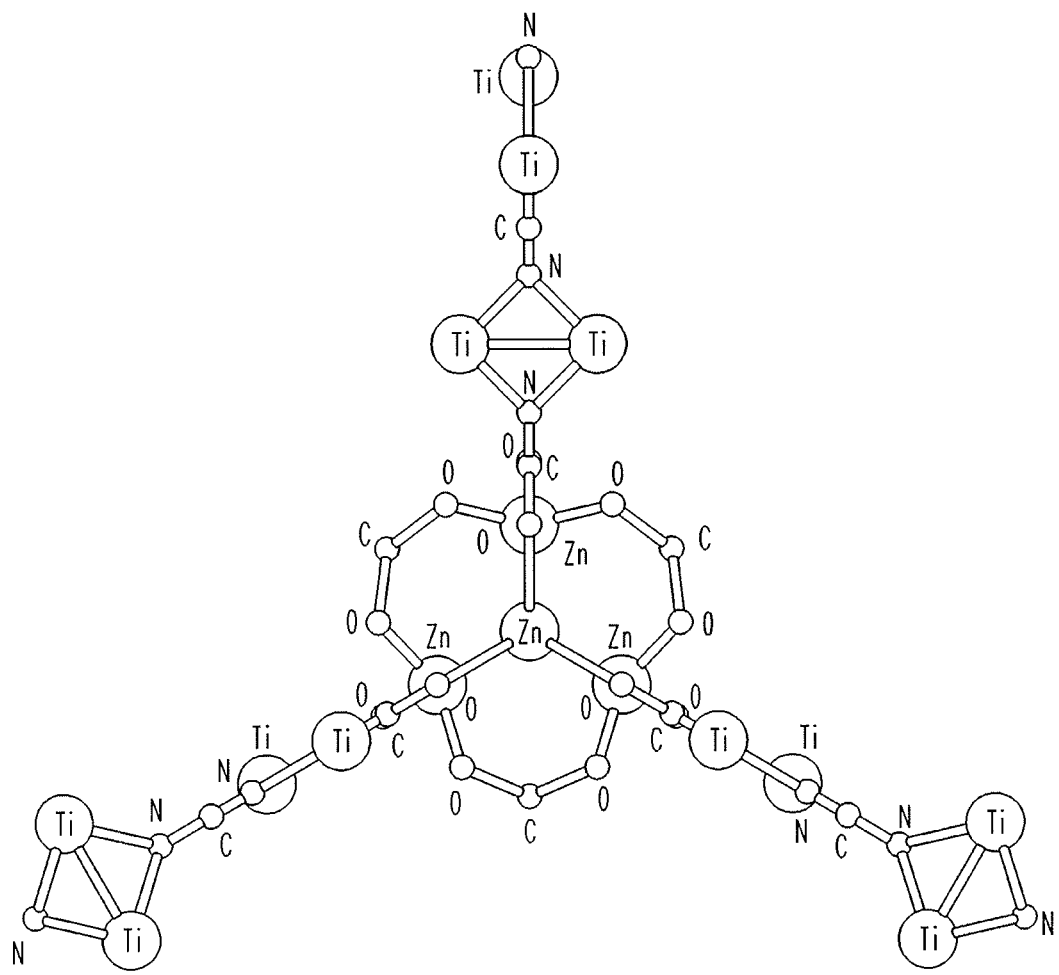
FIG. 7 is a unit cell of a dehydrogenated three-dimensional hydrogen storage material with $Zn_4O_{13}$, according to an embodiment.
Figure 8:
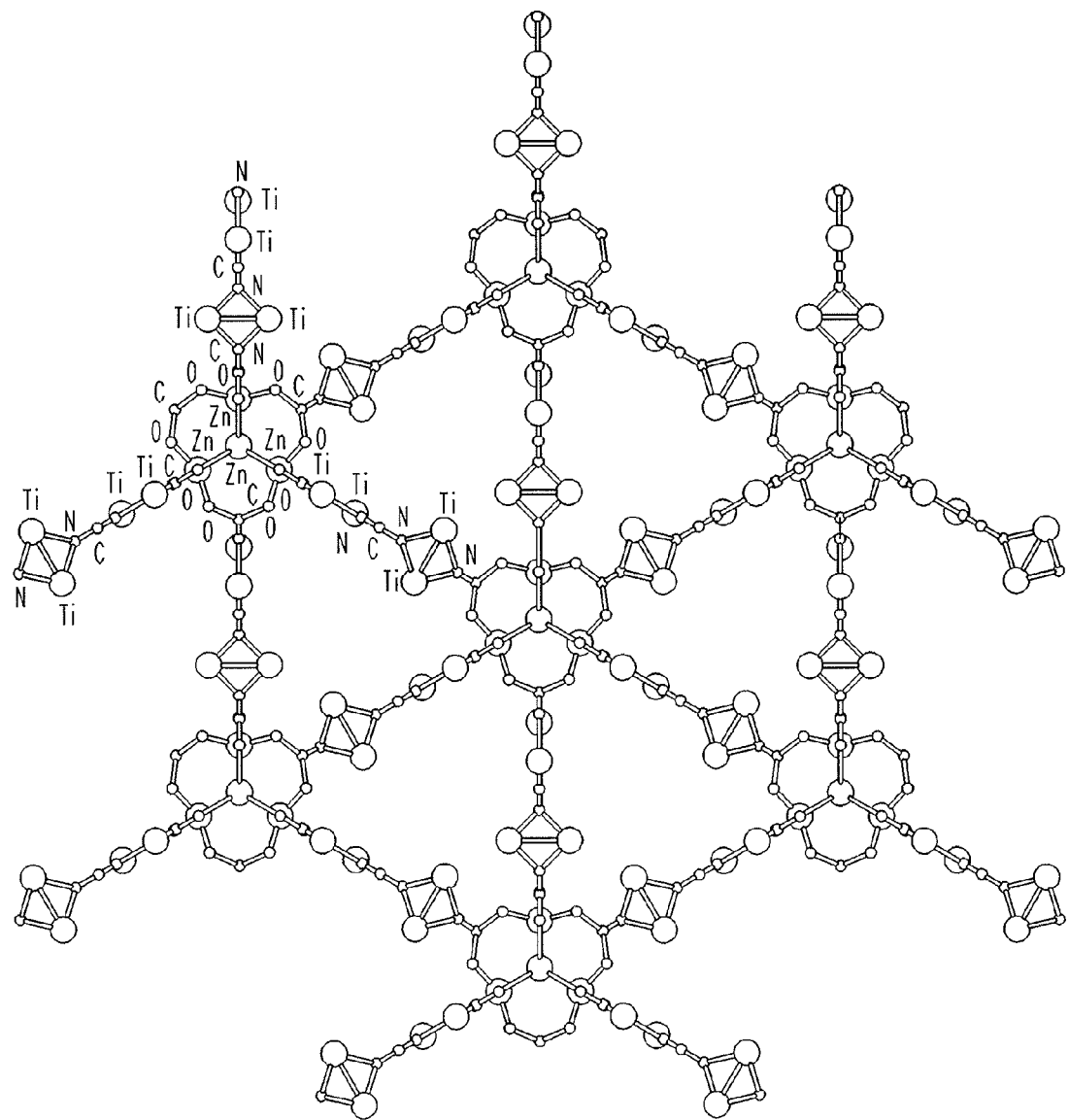
FIG. 8 is an assembled plurality of unit cells forming a dehydrogenated three-dimensional hydrogen storage material with $Zn_4O_{13}$, according to an embodiment.
Figure 9:
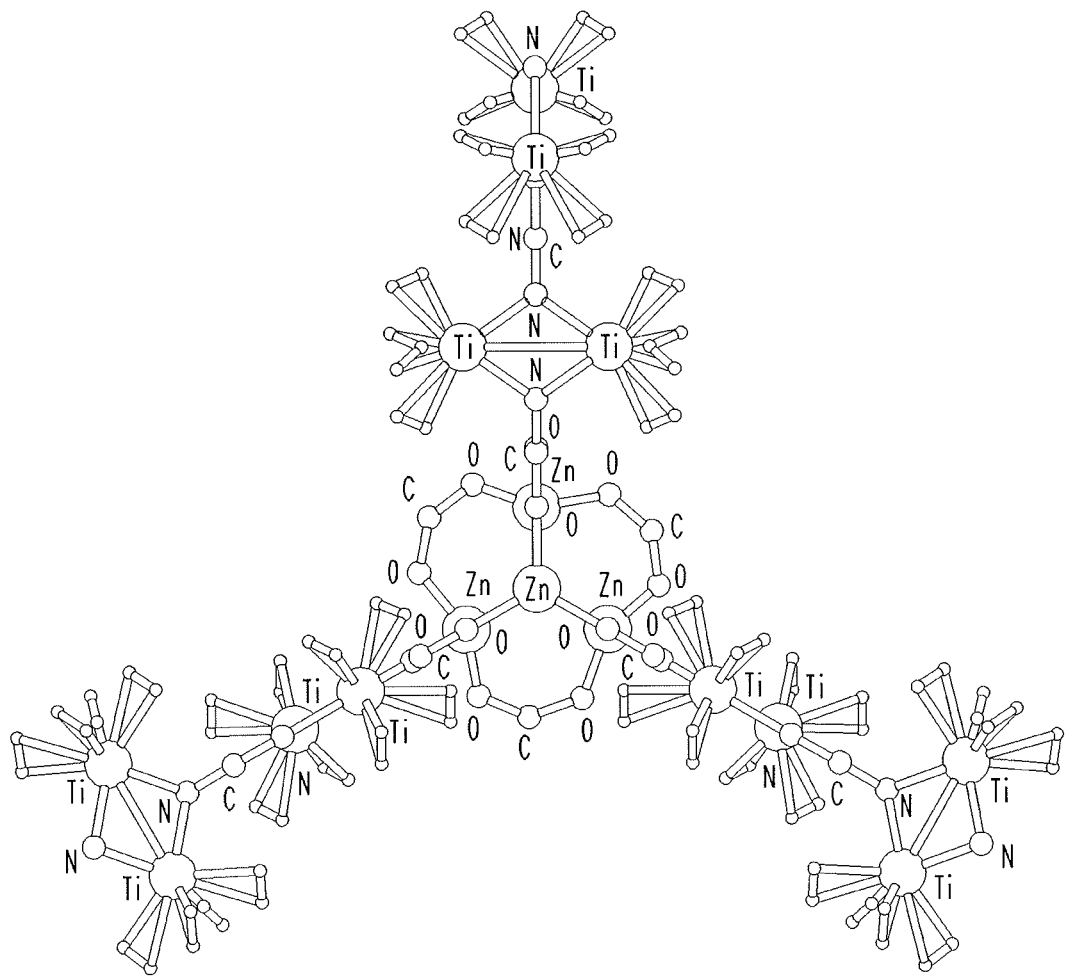
FIG. 9 is a unit cell of a hydrogenated three-dimensional hydrogen storage material with $Zn_4O_{13}$, according to an embodiment.
Figure 10:
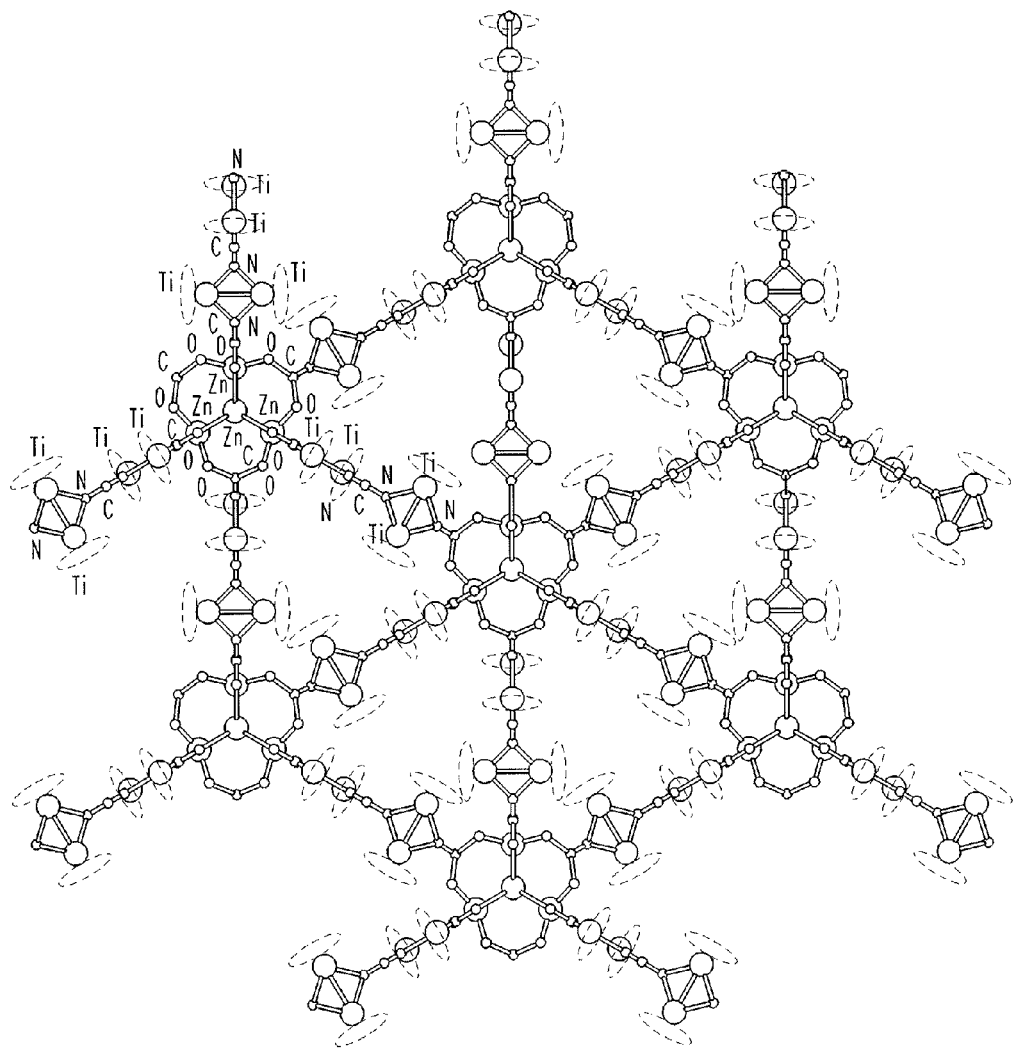
FIG. 10 is an assembled plurality of unit cells forming a hydrogenated three-dimensional hydrogen storage material with $Zn_4O_{13}$, according to an embodiment.

Each linker unit may comprise a hydrogen storage molecular unit, in an embodiment. As mentioned briefly above, the selection of the particular elements included in the hydrogen storage molecular unit may depend on the particular elements that make up the core units of the hydrogen storage molecular unit. For instance, in an example in which the core units are incorporated into a $Zn_4O_{13}$ metal organic framework, the core molecules may be linked together by two $N_2Ti_2$ linker units through a single C atom. FIG. 7 is a unit cell of a dehydrogenated three-dimensional hydrogen storage material with $Zn_4O_{13}$, according to an embodiment, and FIG. 8 is an assembled plurality of unit cells forming a dehydrogenated three-dimensional hydrogen storage material with $Zn_4O_{13}$, according to an embodiment. In an embodiment, the $N_2Ti_2$ linker units may be bonded to carbon atoms that make up part of the $Zn_4O_{13}$ metal organic framework. In this case, when the three-dimensional structure is hydrogenated, as shown in FIGS. 9 and 10 in phantom, the linker units may be capable of adsorbing at least about 6.5% by weight hydrogen, and in some embodiments at least about 6.84% by weight hydrogen. In other embodiments, the core molecules may also be hydrogenated and may increase the weight percent of adsorbed hydrogen contained by the three-dimensional structure. For example, in the case of a metal organic framework including $Zn_4O_{13}$ core molecules, the additional adsorbed hydrogen molecules may make up greater than about 7.0% by weight of the three-dimensional structure.

It will be appreciated that for any of the two-, or three-dimensional structural forms mentioned above, hydrogen may be desorbed by supplying a suitable amount of energy to the hydrogen storage material. For each of these materials the adsorption energy per molecular hydrogen preferably may not exceed 0.5 eV. Consequently, hydrogen may release from these materials when they are heated to a temperature above about 200° C.

The above described structures may be synthesized using any one of numerous conventional methods. In an exemplary embodiment, the hydrogen storage molecular unit may be initially synthesized and subsequently incorporated into a selected two-dimensional, or three-dimensional structure. For example, if the hydrogen storage molecular unit comprises $TiB_2$, $TiB_2$ can be synthesized by mixing $TiO_2$ and $B_4C$ into an aqueous slurry and drying the aqueous slurry for about 8-10 hours at about 100° C. In another embodiment in which the hydrogen storage molecular unit comprises TiN, $TiCl_4$ may be reacted with $NaN_3$ at a temperature between about 350-380° C. for about 8-10 hours. If the hydrogen storage molecular unit comprises TiNB, $TiB_2$ and TiN may be reacted. Alternatively ammonia ($NH_3$) may be reacted with boric acid ($B(OH)_3$) to form a BN network, and Ti may be introduced into the BN network to form TiNB.

In embodiments in which the hydrogen storage molecular unit is used as linker units to form two- or three-dimensional structures, the prepared hydrogen storage molecular unit may be mixed with materials that may make up a desired framework. For example, to incorporate the hydrogen storage molecular unit made up of TiN into a $Zn_4O_{13}$ metal organic framework, TiN may be mixed with zinc nitrate hexahydrate and N,N-diethylformamide and heated at about 100° C.

Figure 11:
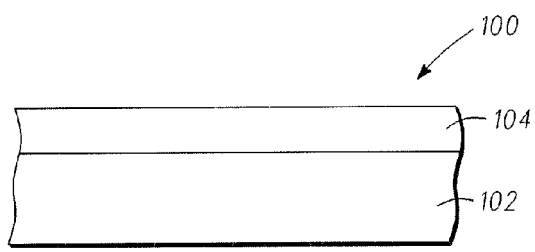
FIG. 11 is a cross-sectional view of a portion of a hydrogen fuel cell.

The hydrogen storage material may be incorporated into a fuel cell. FIG. 11 is a cross-sectional view of a portion of a hydrogen fuel cell 100, according to an exemplary embodiment. The fuel cell 100 may include a substrate 102 and a layer 104 disposed thereover. In an embodiment, the layer 104 may comprise the hydrogen storage material. The layer 104 may be formed using any conventional manner. For example, the layer 104 may be formed from the above-mentioned synthesized material and may be deposited via chemical vapor deposition. The substrate 102 may comprise a material that is different than the layer 104. In an embodiment, the substrate 102 material may be selected based on ability to passive the hydrogen storage material. Alternatively, the hydrogen storage material may be formed into a component to thereby form an energy storage device.

A hydrogen storage material that is a stable structure at temperatures below about 200° C. and pressures of about 1 atm or less has now been provided. The hydrogen storage material may also be a stable structure when exposed to temperatures between about 20-25° C. and to pressures of about 1 atm or less. The hydrogen storage material may include a hydrogen storage molecular unit that may be used to form two-, or three-dimensional solid state structures. Moreover, the hydrogen storage material may be capable of adsorbing at least about 6.5% molecular hydrogen, by weight.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter, it being understood that various changes may be made in the function and arrangement of elements described in an exemplary embodiment without departing from the scope of the inventive subject matter as set forth in the appended claims and their legal equivalents.

What is claimed is:

1. A hydrogen storage material capable of a hydrogenated state and dehydrogenated state, the hydrogen storage material comprising a plurality of hydrogen storage molecular units, each hydrogen storage molecular unit comprising:
 a transition metal; and
 an element from period 2 of the periodic table bonded to the transition metal, wherein each of the hydrogen storage molecular units includes two titanium atoms bonded to two nitrogen atoms and a boron atom bonds a nitrogen atom of a first hydrogen storage molecular unit to a nitrogen atom of a second hydrogen storage molecular unit, wherein each of the two nitrogen atoms is bonded to each of the two titanium atoms, and wherein the hydrogen storage material includes at least 6.5% molecular hydrogen by weight when in the hydrogenated state and is stable at temperatures below about 200° C. and at pressures of about 1 atm and below.

2. The hydrogen storage material of claim 1, wherein:
 the hydrogen storage material forms a two-dimensional structure including a plurality of unit cells; and
 each unit cell includes a plurality of the hydrogen storage molecular units.

3. The hydrogen storage material of claim 1, wherein the hydrogen storage material forms a three-dimensional polyhedral structure including a plurality of vertices and a plurality of linker units linking at least a first vertex to a second vertex, each vertex comprising a first core unit and each linker unit comprising the hydrogen storage molecular unit.

4. The hydrogen storage material of claim 3, wherein each core unit of the plurality of vertices forms a metal-organic framework.

5. The hydrogen storage material of claim 3, wherein each core unit of the plurality of vertices forms a zeolite framework.

6. The hydrogen storage material of claim 5, wherein each core unit comprises $Zn_4O_{13}$.

7. The hydrogen storage material of claim 6, wherein each linker unit comprises $N_2Ti_2$.

8. A hydrogen fuel cell comprising:
 a substrate; and
 a hydrogen storage material disposed on the substrate, the hydrogen storage material comprising a plurality of hydrogen storage molecular units, each hydrogen storage molecular unit comprising a transition metal bonded to one or more elements from period 2 of the periodic table, wherein each of the hydrogen storage molecular units includes two titanium atoms bonded to two nitrogen atoms and a boron atom bonds a nitrogen atom of a first hydrogen storage molecular unit to a nitrogen atom of a second hydrogen storage molecular unit, wherein each of the two nitrogen atoms is bonded to each of the two titanium atoms, and wherein the hydrogen storage material includes at least 6.5% molecular hydrogen by weight when in a hydrogenated state and is stable at temperatures below about 200° C. and at pressures of about 1 atm and below.

9. The hydrogen fuel cell of claim 8, wherein the substrate and the hydrogen storage material comprise different materials and the material of the substrate is capable of passivating the hydrogen storage material.

10. The hydrogen storage material of claim 8, wherein:
    the hydrogen storage material forms a two-dimensional structure including a plurality of unit cells; and
    each unit cell includes a plurality of the hydrogen storage molecular units.

11. The hydrogen storage material of claim 8, wherein the hydrogen storage material forms a three-dimensional polyhedral structure including a plurality of vertices and a plurality of linker units linking at least a first vertex to a second vertex, each vertex comprising a first core unit and each linker unit comprising the hydrogen storage molecular unit.

12. The hydrogen storage material of claim 11, wherein each core unit of the plurality of vertices forms a metal-organic framework.

13. The hydrogen storage material of claim 11, wherein each core unit of the plurality of vertices forms a zeolite framework.

14. The hydrogen storage material of claim 13, wherein each core unit comprises $Zn_4O_{13}$.

15. The hydrogen storage material of claim 14, wherein each linker unit comprises $N_2Ti_2$.

16. The hydrogen storage material of claim 1, wherein each of the hydrogen storage molecular units includes the two titanium atoms bonded directly to each other.

17. The hydrogen fuel cell of claim 8, wherein each of the hydrogen storage molecular units includes the two titanium atoms bonded directly to each other.

* * * * *